Sept. 1, 1953       A. L. A. MORGEN       2,650,528
POWER OPERATED IMPLEMENT ATTACHMENT FOR TRACTORS
Filed Feb. 8, 1949       3 Sheets-Sheet 1
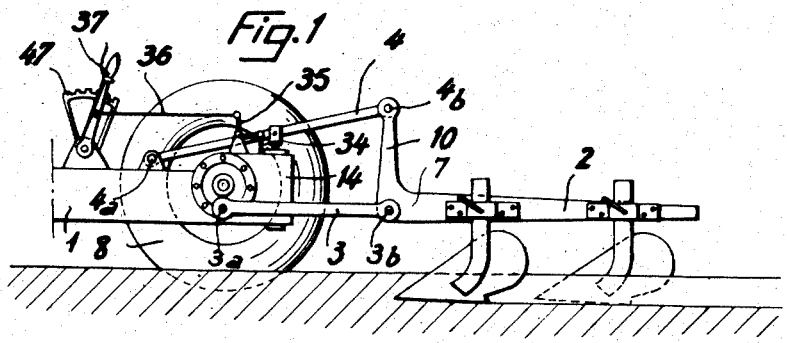
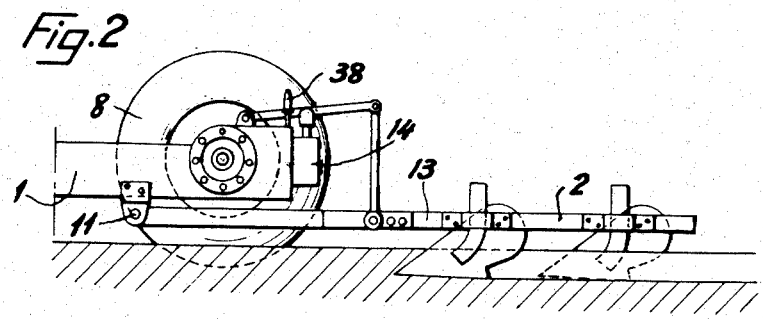
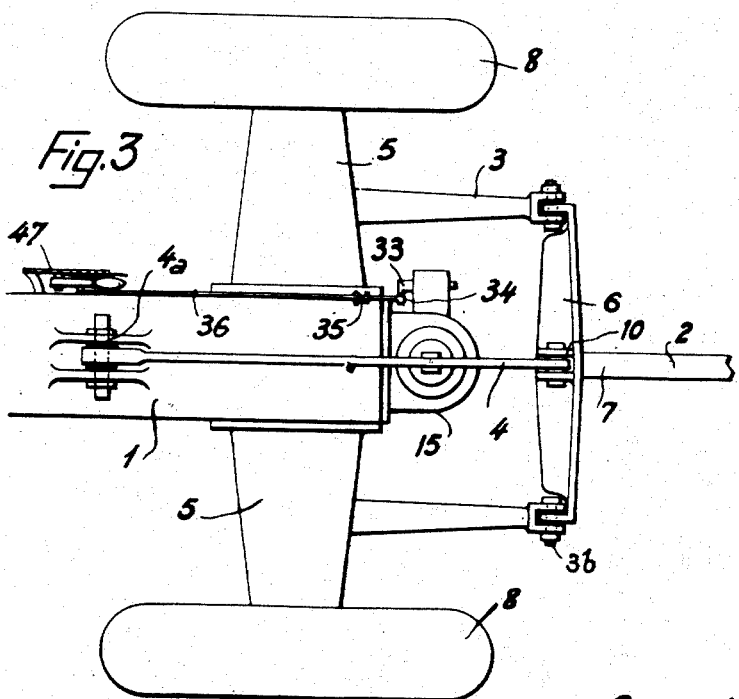

Sept. 1, 1953          A. L. A. MORGEN          2,650,528
POWER OPERATED IMPLEMENT ATTACHMENT FOR TRACTORS
Filed Feb. 8, 1949          3 Sheets-Sheet 2
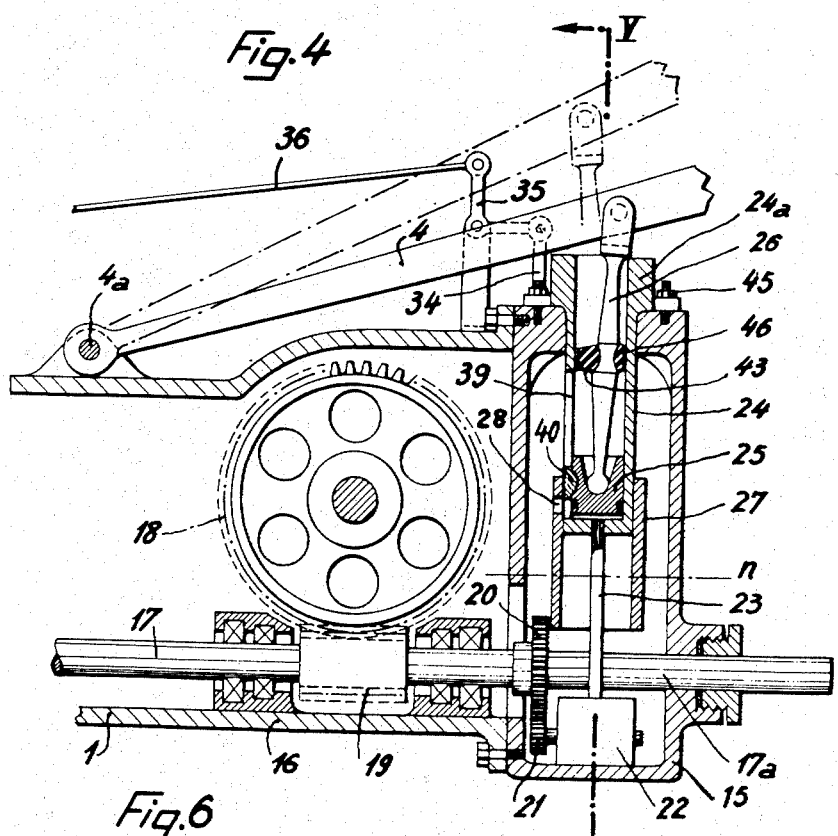
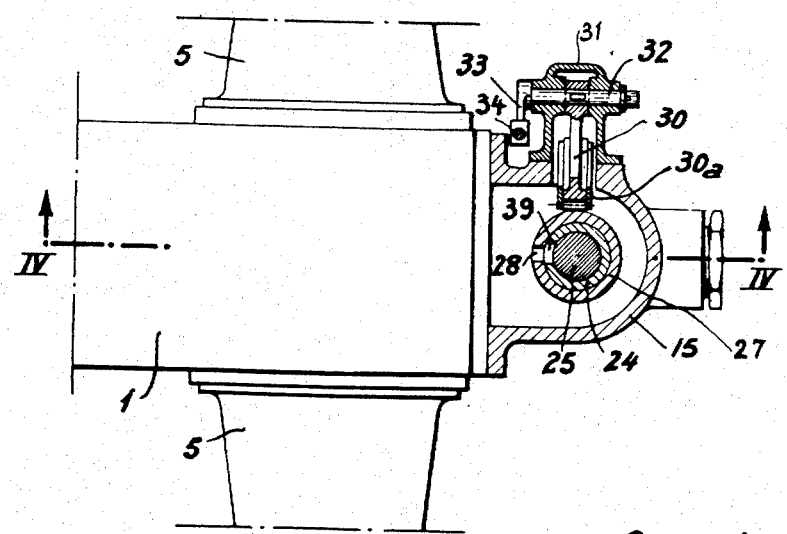

Sept. 1, 1953  A. L. A. MORGEN  2,650,528
POWER OPERATED IMPLEMENT ATTACHMENT FOR TRACTORS
Filed Feb. 8, 1949  3 Sheets-Sheet 3
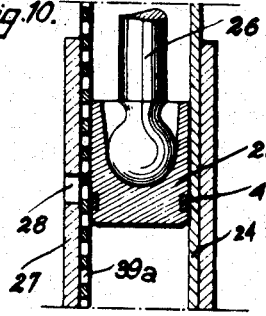
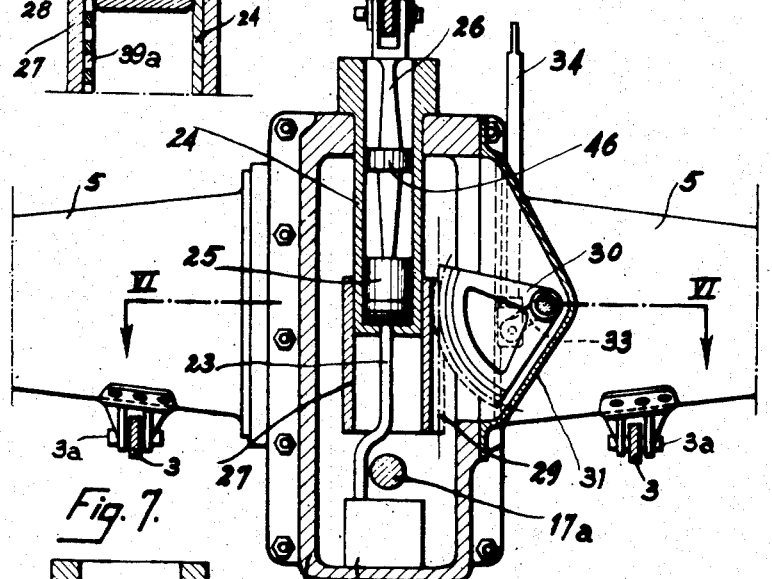
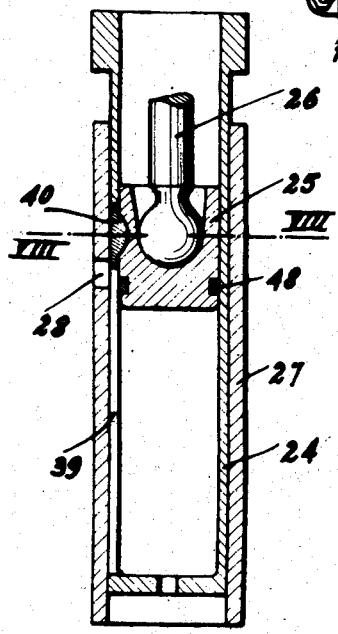
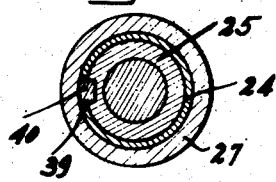
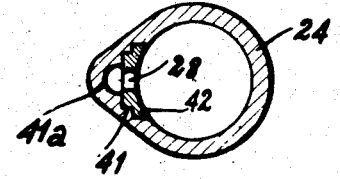

Patented Sept. 1, 1953

2,650,528

UNITED STATES PATENT OFFICE 2,650,528

POWER OPERATED IMPLEMENT ATTACHMENT FOR TRACTORS

André L. A. Morgen, Reims, France

Application February 8, 1949, Serial No. 75,233
In France January 18, 1949

5 Claims. (Cl. 46—59)

1

The implements for working the soil, such as used in agriculture or civil engineering, are usually linked to a tractor by an attachment device made of rigid members, comprising at least one pivoting axle. This arrangement provides an excellent attachment of the implement to the tractor and the elevation, support and transport of said implements by the tractor after completion of a task.

One drawback of this type of attachment device is the difficulty of ensuring a constant level of work for the tool. In fact, because of the presence of the joint or joints, the tool has a tendency to gradually sink into the soil under the action of its own weight. Furthermore, most of these tools, for instance, ploughs, because of the shape of the portion penetrating the soil, are submitted, when they are driven, to a vertical downwards reaction which is added to the action of the weight. This reaction is of course necessary to prevent the tool from spontaneously getting off the ground.

A tool connected to a tractor through an attachment device of the type described, has thus a tendency to work deeper and deeper. Consequently it is necessary to prevent this deepening through a stop device. Amongst the stop devices, a hydraulic jack for lifting the tools having its stroke stopped at a predetermined point has been already proposed.

The known devices of this type have a number of drawbacks.

First, they are intricate and fragile. The liquid conduits, which are many and long, and also provided with valves, afford a source of leakage which may render these devices useless.

Further, the length of the liquid circuits brings a notable lag in the adjustment of the position of the lifting jack piston, that is, in the adjustment of the depth of the work.

Finally, the adjustment of the position of the piston in the lifting jack is obtained by confining a certain quantity of liquid in that lifting jack by means of valves. Besides the possible leaks which can modify the quantity of confined liquid, that quantity is dependent on the closing of the valves, that is, on the hydraulic pressure which is dependent on the stresses exerted on the tools. Consequently when the working conditions of the tools vary, for instance because of a change in the character of the soil or of ground irregularities, these valves can open and alter the position of the piston, and consequently the level of work for the tool.

The invention has for its object to obviate the above mentioned drawbacks. A particular object of the invention is to give the tools a predetermined position which is maintained with respect to the tractor which carries them in such a way that the level of the work remains the same. It also provides for raising the tools to inoperative position at the end of the work.

According to the invention, the attachment device between the tool and the tractor is submitted to the action of a hydraulic device comprising a pump permanently feeding a liquid and a lifting jack, connected to that pump acting on said attachment device for lifting it, and whose cylinder is provided laterally with an exhaust port, the position of which is adjustable, for the liquid discharged by the pump.

In that way, the pump moves the piston of the lifting jack until this piston uncovers the discharge port and, when this port is uncovered the piston cannot move any more because it cannot go back nor overcome the force exerted by the tools because of the fall of pressure resulting from the discharge port.

In a preferred embodiment of the invention the set comprising the pump and lifting jack is enclosed in a tight casing containing the liquid, from which casing the pump sucks while the liquid discharged through the port falls back in said casing.

According to a feature of the invention, the liquid, which is preferably oil, constantly flows, which puts the pump in favorable working conditions, avoids using valves and makes the manufacture simpler. Furthermore, when using a tight casing, the oil conduits are shorter and well protected which reduces the risks of leak and in practice enables the device to work instantaneously.

The general principles of the invention and the relation of parts in a preferred embodiment of the invention are described in the following specification and illustrated in the accompanying drawings. The broad scope of the invention is particularly set forth in the appended claims.

Fig. 1 is a diagrammatic elevational view of the attachment device between a tractor and a plough through a known device of pivoted quadrangle.

Fig. 2 shows a modification of the attachment device having only one pivoted axle.

Fig. 3 is a diagrammatic plan view of the attachment device shown in Fig. 1.

Fig. 4 is a partially diagrammatic cross-section of a rear-axle of a tractor equipped with a device for lifting and adjusting the depth of the work according to the invention. This figure is a cross-section of Fig. 6 on the line IV—IV.

Fig. 5 is a sectional view on the line V—V of Fig. 4.

Fig. 6 is a sectional view on the line VI—VI of Fig. 5.

Fig. 7 shows, on a larger scale, an axial cross-section of the hydraulic jack of the device shown in Figs. 4, 5 and 6.

Fig. 8 is a sectional view on the line VIII—VIII of Fig. 7.

Fig. 9 is a cross-section of a modification of the lifting jack shown in Figs. 7 and 8.

Fig. 10 shows, in a partial cross-section analogous to Fig. 7 another modification of the lifting jack.

The tractor 1, shown in Figs. 1 and 3, drives a plough 2 through an attachment device of the pivoted quadrangle type comprising two traction bars 3 and a compression bar 4. In this embodiment, traction bars 3 are pivoted at 3a under the axle housings 5 of the rear axle of the tractor, and also at 3b on a swing bar 6 which may be rigidly locked with the beam 7 of the plough or pivoted on this beam. On the other hand, compression bar 4 is pivoted at 4a in the vertical medial plane of the tractor on bearings secured at the rear of the tractor, and, at its other end, compression bar 4 is pivoted at 4b at the top of a rigid upright 10 integral with beam 7. In this case, the attachment device comprises the four pivots 3a, 3b, 4a and 4b.

In the example shown in Fig. 2, the beam 13, rigid and having the shape of a fork, of plough 2 is connected and pivoted at its ends with a pivot 11 located under the tractor 1 in front of driving wheels 8.

In the examples of attachment device shown in Figs. 1 and 2, the driven tool, a plough, has a tendency to progressively sink into the soil under the action of its weight, and also as a consequence of the driving force because of the shape of its share, whose reaction with the soil comprises a downwards directed vertical component. In order to limit the depth of this penetration, to ensure a constant value for this depth, to be able to adjust it during the work and finally to enable the lifting of the tools at the end of the work, the compression bar 4, in the example of Fig. 1 and the beam 13 in the example of Fig. 2, are connected directly and indirectly respectively to a hydraulic device 14 providing a lifting force. An embodiment of this device is shown in Figs. 4, 5 and 6, its main portion, that is the lifting jack, being shown with details in Figs. 7 and 8.

The whole device 14 is contained in a casing 15 applied against the casing 16 (diagrammatically shown in Fig. 4) which contains the rear axle of the tractor. In this last casing is arranged the shaft 17, rotatably driven by the engine and driving the ring gear 18 of the rear axle, for instance through a worm screw 19. In a known way the shaft 17 is extended by a portion 17a protruding at the rear of the casing and providing power means for using the tractor in a stationary position. In this case, a de-clutch member (not shown) of any type does not permit the drive of the driving wheels.

On the portion 17a of the shaft is keyed a pinion 20 driving, through a pinion 21, a pump 22 of any type immersed in oil whose level is for instance at n. The outlet of this pump is connected by the pipe 23 to the end of a stationary cylinder 24 bearing, by the flange 24a, on the casing 15. Holding members 45 may be provided for preventing cylinder 24 from raising occasionally under the action of the upwards vertical stresses.

In the cylinder 24 moves the piston 25 which by means of a rod 26, connected for instance to that piston by a ball joint, exerts a lifting thrust on compression bar 4.

In order to prevent the entry of foreign bodies in the casing 15 through the opening of cylinder 24, it is advisable to secure to the rod 26, a ring 43, made for instance of synthetic rubber which is not liable to be deteriorated by oil. This ring is enclosed in a sleeve 46 sliding in cylinder 24. When it is moved by rod 26, this ring continuously closes the free opening of cylinder 24, without preventing the lateral motions of the rod. It is also a shock absorber for the lateral motions of the bar 4 during the work.

Over cylinder 24 can slide a second cylinder 27 having a port 28. In the shown example the cylinder 27 has on its side a rack 29 (Figs. 5 and 6) which meshes with a toothed sector 30, able to move in the bearings of a casing 31 laterally secured to casing 15. The flanges 30a (Fig. 6) of the toothed sector prevent the cylinder 27 from rotating relatively to cylinder 24. The axle 32 of sector 30 has a crank 33, on which is pivoted an operating rod 34.

In Figs. 1 and 3, the rod 34 is connected through a bell-crank 35, to a second rod 36 which can be actuated by a handle 37. In the case of Fig. 2, the end of rod 34 is supported to be actuated directly by a handle 38.

In both cases, the operation in the vertical direction of the rod 34, by handles 37 or 38, causes the sector 30 to rotate, and thereby cylinder 27 to slide over cylinder 24, that is the position of port 28 to move with respect to piston 25.

Means to fix the rod 36 in position and prevent any untimely sliding of cylinder 27, may be designed. It may comprise the combination of a fine toothed sector and a pawl provided with a spring (Fig. 1). However such a means is not absolutely necessary, as it will be explained further.

The enlarged section of Fig. 7 shows the cylinder 24 comprising, along one generatrix, a slot 39 which corresponds to the whole stroke of piston 25. A series of small holes 39a evenly distributed along a generatrix of cylinder 24, may be substituted to slot 39. On the other hand, the piston 25 is provided with packing rings 48 and key 40 whose width is equal to the width of slot 39 and which practically closes this slot for preventing oil to pass through. When a series of holes is substituted to slot 39, the piston 25 evidently does not comprise any key. During the motion of relative translation of cylinder 27 over cylinder 24, the port 28 permanently remains in front of the slot 39 or holes 39a, but its level is adjustable relatively to the bottom of cylinder 24 through which flows the oil.

The operation of the device is as follows:

Let us assume, as it is shown in Fig. 4, that the piston 25 is at the lowest point of its stroke in cylinder 24 and that the port 28 is adjusted at any predetermined height relatively to the bottom of this cylinder.

When the shaft 17 rotates, the pump 22 delivers forced fed oil into cylinder 24. This oil causes the piston 25 to go upwards until the key 40 uncovers port 28. The oil, discharged by pump 22, passing through this port, falls into the casing and the lift of the piston is limited. According to the stress received by the piston rod, the port 28 is more or less uncovered but, except for this small variation, the position of the piston is determined by that of port 28. When the height of the attachment device has been predetermined by the position given to port 28, it cannot thus be altered as a function of the stresses to which the attachment device is submitted. In that respect, whatever be the character of the soil or the surface irregularities of the ground, the level of work of the tool remains constant.

When, during the work, it is necessary to alter that level, it is enough to operate rod 34 for moving cylinder 27 relatively to cylinder 24. Considering the short length of the pipe 23, the variation is almost instantaneous. Finally, when the work is complete, the lifting above the level of the ground of the driven tools is automatically obtained by lifting cylinder 27 at the maximum height. It is of course possible to occasionally lock these tools at the highest position by means of any mechanical member.

The oil feeding of cylinder 24 being continuous, the oil contained in the cylinder under piston 25 may without detriment slightly leak through the packing rings or slot 39 without altering the level of the piston. Because of this slot, the oil which had occasionally passed above the piston returns automatically to casing 15. Of course the ring 43 prevents this oil to be ejected outside.

Instead of using two concentric cylinders, as it is shown in Figs. 7 and 8, the travel of port 28 in the stationary cylinder 24 containing the piston may also be obtained in the way diagrammatically shown in Fig. 9.

In this case, the cylinder 24 has a wide longitudinal slot 41 which is closed by a plate 42, having the shape of a portion of cylinder. In this plate 42 is provided the port 28. The bottom 41a of slot 41 carries the return of the oil.

It will be evident that the device according to the invention, provided it is equipped with a pump having large dimensions, is free from the leaks of oil which may occur in the circuit. Further these leaks are not to be expected because they can happen only on the duct 23 which is perfectly protected.

Besides, in the device according to the invention the continuous circulation of oil in a closed circuit avoids using delivery or safety valves in said circuit. And also the working of the pump at a constant pressure is particularly advantageous for keeping this pump in good working condition.

Finally, the continuous circulation of oil ensures a hydraulic locking of the member provided with the port 28, and in practice no supplemental means are necessary for maintaining this member at its proper position during the work.

In the shown examples, the device has been supposed to be arranged in a vertical position. However it is to be understood that by suitable means the device may be given an arbitrary orientation which may be for instance selected in order to easily mount the device on the tractor.

What I claim is:

1. In a tractor having an earth moving implement pivotally mounted thereto; means for maintaining the implement at a fixed height relatively to a horizontal axis of the tractor comprising an enclosed hydraulic fluid-retaining casing in fixed association with the tractor, said casing having mounted therein a continuously operable hydraulic pump, a hydraulic jack having a hydraulic pressure chamber in fixed relation to the casing and having one end of said chamber in fluid communication with the pressure side of said pump through a valveless conduit, a piston in said chamber with said piston's inner end defining the other end of the chamber, the outer end of said piston being linked to said implement to support the latter, the chamber having along the piston's movement a discharge passage means for pressure fluid, and movable means in telescopic relation to said pressure chamber having a port therein adapted to be brought into registry with the discharge passage means at a predetermined point in the piston's movement under pressure of the fluid by the pump to the chamber, to thereby limit the fluid pressure movement of the piston and the movement of the implement to a predetermined height relatively to the horizontal axis of the tractor.

2. Means according to claim 1 wherein the discharge passage means extend longitudinally of said pressure chamber, and the means in telescoping relation to said pressure chamber is movable axially of said pressure chamber and has associated therewith manually operable means within the control of the tractor's operator to provide intentional variation of the point of registry between the port in said telescoping means and the discharge passage means.

3. Means according to claim 1 wherein said jack comprises a stationary inner cylinder defining the hydraulic pressure chamber and has a slot along a generatrix thereof, the means in telescoping relation to said chamber being a cylinder adapted to slide over the stationary cylinder to bring the port into registry with the slot and a mechanism adapted to translate the outside cylinder along the inside cylinder; the piston having a key slidably disposed in said slot to prevent passage of fluid along the slot past the piston.

4. Means according to claim 1 wherein said jack comprises a stationary inside cylinder defining said hydraulic pressure chamber and has a series of holes along a generatrix thereof, the means in telescoping relation to said chamber being an outside cylinder adapted to slide over the stationary cylinder and having a port adapted to be brought into progressive registry with the holes of said series of holes, and a mechanism adapted to translate the outside cylinder along the inside cylinder.

5. Means according to claim 1 wherein the said jack comprises a cylinder defining said pressure chamber and has a longitudinal slot, a plate slidably disposed in said slot and being formed with an internal surface similar and continuous with respect to the internal surface of said cylinder and with at least one hole therein constituting the discharge passage means and a mechanism adapted to translate the said plate along said slot.

ANDRÉ L. A. MORGEN.

References Cited in the file of this patent

UNITED STATES PATENTS

| Number | Name | Date |
|---|---|---|
| 1,004,541 | Martin | Sept. 26, 1911 |
| 1,047,146 | Balloco | Dec. 17, 1912 |
| 1,484,030 | Kitchen | Feb. 19, 1924 |
| 2,118,180 | Ferguson | May 24, 1938 |
| 2,198,196 | Goldup | Apr. 23, 1940 |
| 2,287,479 | Kelsey | June 23, 1942 |
| 2,423,485 | Court | July 8, 1947 |
| 2,540,429 | Cordes | Feb. 6, 1951 |

FOREIGN PATENTS

| Number | Country | Date |
|---|---|---|
| 253,566 | Great Britain | June 14, 1926 |